United States Patent
Wolff et al.

(10) Patent No.: US 9,889,746 B2
(45) Date of Patent: Feb. 13, 2018

(54) SYSTEM AND METHOD FOR REDUCING FUEL CONSUMPTION IN A VEHICLE

(71) Applicant: General Electric Company, Schenectady, NY (US)

(72) Inventors: Jeffrey John Wolff, Lawrence Park, PA (US); Ajith Kuttannair Kumar, Erie, PA (US); Henry Todd Young, Erie, PA (US); Jason Daniel Kuttenkuler, Erie, PA (US); Maksim V. Borisenko, Lawrence Park, PA (US); Edward Petrak, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/974,071

(22) Filed: Dec. 18, 2015

(65) Prior Publication Data

US 2016/0101699 A1    Apr. 14, 2016

Related U.S. Application Data (63) Continuation-in-part of application No. 14/094,333, filed on Dec. 2, 2013, now Pat. No. 9,234,471.

(60) Provisional application No. 61/732,312, filed on Dec. 1, 2012.

(51) Int. Cl.

| | |
|---|---|
| *F02D 41/12* | (2006.01) |
| *B60L 7/20* | (2006.01) |
| *B60L 11/06* | (2006.01) |
| *B60L 7/16* | (2006.01) |
| *B60W 30/182* | (2012.01) |
| *F02D 29/02* | (2006.01) |
| *F02N 11/08* | (2006.01) |

(52) U.S. Cl.
CPC .................... *B60L 7/20* (2013.01); *B60L 7/16* (2013.01); *B60L 11/06* (2013.01); *B60W 30/182* (2013.01); *F02D 29/02* (2013.01); *F02N 11/0862* (2013.01)

(58) Field of Classification Search
CPC ...... H02P 3/12; H02P 3/14; B60L 7/20; B60L 7/16; B60L 11/06; B60W 30/182; B60W 30/18109; B60W 30/18136; B60W 10/06; B60W 10/08; F02D 29/02; F02D 13/04; F02D 41/042; F02N 11/0862
USPC ................... 123/320; 701/112; 318/375, 376
See application file for complete search history.

(56) References Cited

U.S. PATENT DOCUMENTS

| | | |
|---|---|---|
| 3,585,473 A | 6/1971 | Huxtable et al. |
| 5,351,775 A | 10/1994 | Johnston et al. |

(Continued)

*Primary Examiner* — Hai Huynh
(74) *Attorney, Agent, or Firm* — Global Patent Operation; John A. Kramer (57) ABSTRACT

A drive system includes an engine, an alternator coupled to the engine, the alternator being configured to power at least one auxiliary load, a traction motor system operatively coupled to drive wheels of the vehicle, the traction motor system being configured for receiving primary electrical power from the alternator and for propelling the vehicle in response to the primary electrical power, and a motor electrically connected to the traction motor system and mechanically coupled to the engine. The motor is configured to receive electrical power from the traction motor system in a dynamic braking mode of operation of the traction motor system and to communicate power to the engine during the dynamic braking mode.

22 Claims, 5 Drawing Sheets

(56) References Cited

U.S. PATENT DOCUMENTS

| | | | |
|---|---|---|---|
| 6,486,568 B1 * | 11/2002 | King | B60L 11/02 |
| | | | 307/66 |
| 6,803,734 B2 | 10/2004 | Kumar et al. | |
| 7,034,480 B2 | 4/2006 | Kumar et al. | |
| 7,061,131 B2 | 6/2006 | King et al. | |
| 7,448,328 B2 | 11/2008 | Kumar | |
| 7,532,960 B2 | 5/2009 | Kumar | |
| 7,812,555 B2 * | 10/2010 | Adra | B60L 11/04 |
| | | | 180/65.21 |
| 8,062,169 B2 | 11/2011 | Marr et al. | |
| 8,180,544 B2 * | 5/2012 | Noffsinger | B60L 7/16 |
| | | | 303/167 |
| 8,395,335 B2 | 3/2013 | Marchand et al. | |
| 8,857,542 B2 | 10/2014 | Hendrickson et al. | |
| 2010/0039054 A1 * | 2/2010 | Young | B60W 10/26 |
| | | | 318/376 |
| 2015/0002056 A1 | 1/2015 | Young et al. | |

* cited by examiner

SYSTEM AND METHOD FOR REDUCING FUEL CONSUMPTION IN A VEHICLE

CROSS-REFERENCE TO RELATED APPLICATIONS

This application is a continuation-in-part of U.S. application Ser. No. 14/094,333, filed Dec. 2, 2013, which claims priority to U.S. Provisional Application No. 61/732,312 filed Dec. 1, 2012, both of which are incorporated by reference herein in their entireties.

BACKGROUND

Technical Field

Embodiments of the invention relate generally to vehicle control. Certain embodiments relate to systems and methods for reducing fuel consumption in a vehicle in a dynamic braking mode of operation.

Discussion of Art

In the mining industry, large off-highway vehicles, "OHVs", usually employ electrically motorized wheels for propelling or retarding the vehicle. In particular, OHVs typically include a large horsepower diesel engine in conjunction with an alternator, a traction inverter, and wheel drive assemblies housed within the rear tires of the vehicle. In operation, the diesel engine drives the alternator, which powers the traction inverter. The traction inverter includes semiconductor power switches that commutate the alternator output current to provide electrical power to electric drive motors, e.g., AC traction motors, of the wheel drive assemblies, which transform the electrical power back into mechanical power to drive the wheels and propel the vehicle.

As is understood in the art, the traction motors provide the tractive power to propel the vehicle. The traction motors are also configured to provide a braking force for controlling speed or for slowing the vehicle. This is commonly referred to as dynamic braking. Simply stated, when a traction motor is not needed to provide motive force, it can be reconfigured so that the motor operates as a power generator. So configured, the traction motor generates electric energy which has the effect of slowing the vehicle. In certain vehicles and systems, the electrical energy is stored in batteries for later use or, more commonly, dissipated via retarding grids. In particular, some vehicles and systems are configured to store the electrical energy provided by the motor during dynamic braking in energy storage devices or batteries for later use. This stored energy is used to power auxiliary devices and/or drive motors during idling or propel modes of operation so as to minimize engine involvement and reduce fuel consumption.

A favored alternative to storage configurations serves to simply waste the energy in the form of heat via a dynamic braking retarding grid of resistors and insulators. A drawback to this, however, is that a grid cooling system having an electrically driven blower is often necessary to help dissipate heat from the grid, which adds to power demand and thus increases fuel consumption.

Even during dynamic braking, the engine continues to consume fuel to meet the electrical needs and auxiliary loads of the vehicle. For example, this includes providing power for traction motor blowers, radiator fans, operator cab heater or air conditioner alternator blower, hydraulic pumps, etc. In the case of OHVs, this includes providing power for cooling fans to cool all components in the traction drive system.

In view of the above, there is a need for a system and method which reduces fuel consumption during dynamic braking modes of operation by reclaiming dynamic braking energy, and which improves the overall efficiency of an electric drive machine.

BRIEF DESCRIPTION

In an embodiment, a drive system for a vehicle includes an engine, an alternator coupled to the engine, and a traction motor system. The alternator is configured to power at least one auxiliary load. The traction motor system is operatively coupled to drive wheels of the vehicle, and is configured for receiving primary electrical power from the alternator and for propelling the vehicle in response to the primary electrical power. The drive system further includes a motor electrically connected to the traction motor system and mechanically coupled to the engine. The motor is configured to receive electrical power from the traction motor system in a dynamic braking mode of operation of the traction motor system and to communicate power to the engine during the dynamic braking mode.

In another embodiment, a drive system for a vehicle includes an engine, an alternator coupled to the engine, and a traction motor system. The alternator is configured to power at least one auxiliary load. The traction motor system is operatively coupled to drive wheels of the vehicle, and is configured for receiving primary electrical power from the alternator and for propelling the vehicle in response to the primary electrical power. The drive system further includes a three-phase inverter/rectifier electrically connected to the traction motor system and to the alternator. The inverter/rectifier is configured to receive electrical power from the traction motor system in a dynamic braking mode of operation of the traction motor system and to feed the electrical power to the alternator as torque to reduce engine load.

In yet another embodiment, a method is provided. The method includes the steps of generating primary electrical power at an alternator connected to an engine, operating a traction motor coupled in driving relationship to a wheel of a vehicle to propel the vehicle during a propel mode of operation and to generate electricity during a dynamic braking mode of operation, wherein in the propel mode of operation the primary electrical power is transmitted to the traction motor to power the motor, and utilizing the electricity generated during the dynamic braking mode of operation to offset an auxiliary engine load to decrease fuel consumption of the vehicle (e.g., versus an operating mode where electricity generated during dynamic braking is not used to offset an auxiliary engine load).

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use with both mobile and stationary implementations, for ease of explanation a mobile implementation is described in detail herein. More specifically, an OHV has been selected for clarity of illustration for the disclosure of mobile embodiments. Other suitable vehicles include, for example, on-road vehicles, locomotives, construction equipment, industrial equipment, and marine vessels. As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

Figure 1:
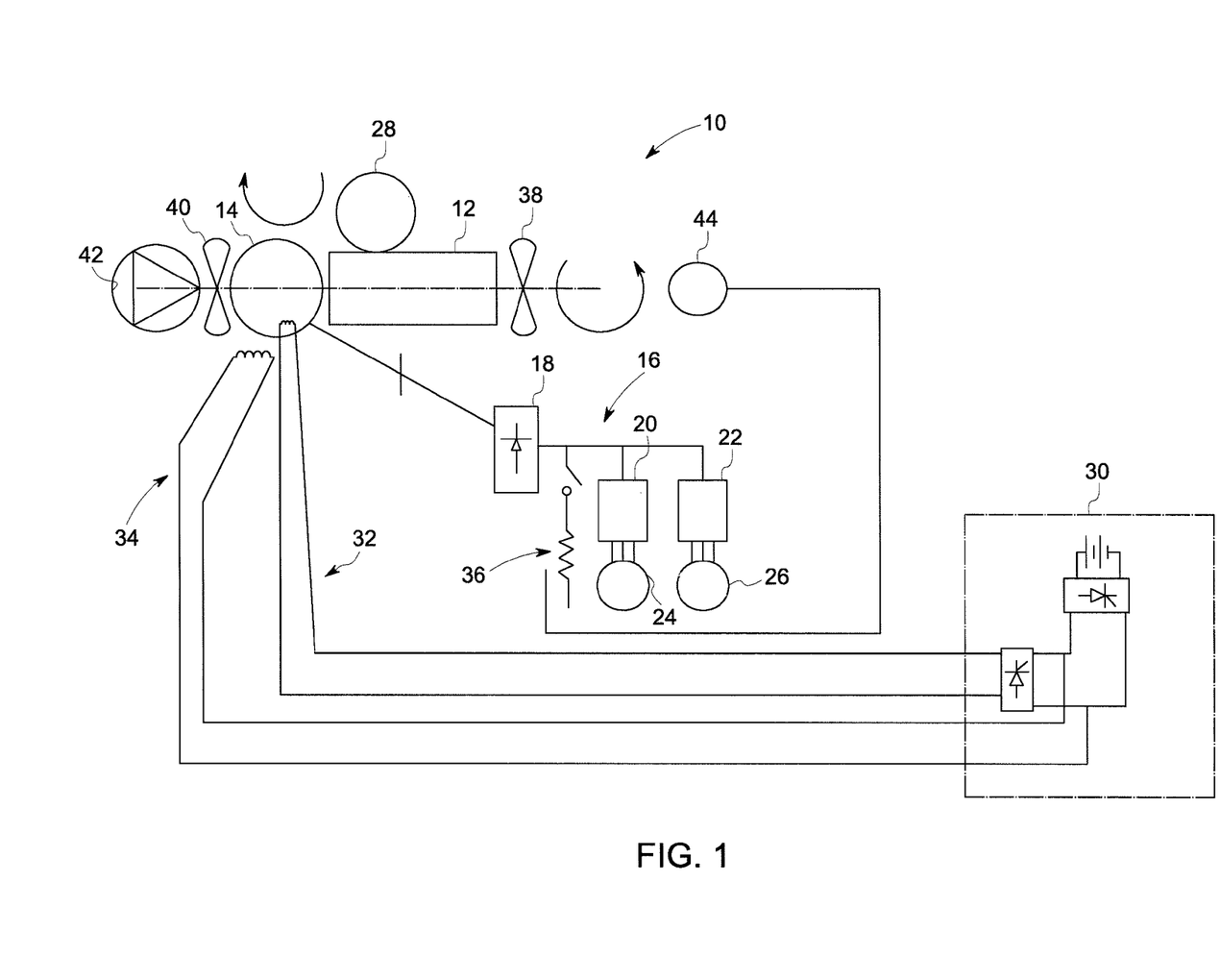
FIG. 1 is a simplified schematic diagram of a system for reducing fuel consumption in a vehicle, according to an embodiment of the invention.

FIG. 1 schematically illustrates an exemplary drive system 10 for an electric drive machine such as an OHV or other vehicle. The drive system 10 includes a primary power source such as an engine 12 (e.g., a diesel engine, a gasoline engine, a multi-fuel engine, etc.) and a traction alternator/generator 14 mechanically coupled to and driven by the engine 12. As illustrated in FIG. 1, the traction alternator 14 is electrically coupled to a traction bus 16. The alternator 14 is configured to provide AC electric power to one or more rectifiers 18, which are electrically connected to one or more power converters, e.g., first and second inverters 20, 22, via the traction bus 16. The inverters 20, 22 are connected to first and second traction motors 24, 26 associated with first and second wheels of the vehicle, respectively. As is known in the art, the rectifier 18 is configured to convert the AC power received from the alternator 14 into a DC output which is then fed to the inverters 20, 22 through the traction bus 16. The inverters 20, 22 are configured to supply three-phase, variable frequency AC power to the first and second traction motors 24, 26 associated with the first and second wheels of the vehicle (typically the rear wheels of the vehicle). While the rectifier 18 is illustrated as being separate from the traction alternator 14, in certain embodiments, the rectifier may form a part of the alternator, as is known in the art. In an embodiment, the traction bus 16 is 1000-1500 VDC bus.

As also shown in FIG. 1, in an embodiment, a starter motor 28 may be associated with the engine 12 for rotating the engine 12 so as to initiate operation, as is known in the art. In addition, the vehicle may include a battery 30, e.g. a 24V battery, electrically coupled to the alternator 14 through a tertiary winding 32 and a field winding 34. The battery 30 is configured to function as an alternator field static exciter to initiate operation of the electric drive system of the vehicle.

The traction motors 24, 26 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 24, 26. During a propel mode of operation, power may be transferred from the engine 12 to the traction motors 24, 26, and thus to the wheels of the vehicle to effect movement.

In addition to providing motive power, the traction motors 24, 26 also provide a braking force for controlling the speed of the vehicle on which the drive system 10 is deployed. This is commonly referred to as dynamic braking. During a dynamic braking mode of operation, such as when motion of the vehicle is to be retarded, power may be generated by the mechanical rotation of the drive wheels and directed toward a retarding grid 36. In particular, the kinetic energy of the vehicle may be converted into rotational power at the drive wheels. Rotation of the drive wheels may further rotate the motors 24, 26 so as to generate electrical power, for example, in the form of AC power. The inverters 20, 22 may serve as a bridge to convert the power supplied by the motors 24, 26 into DC power. Dissipation of the DC power generated by the motors 24, 26 may produce a counter-rotational torque at the drive wheels to decelerate the vehicle. Such dissipation may be accomplished by passing the generated current provided by the inverters 20, 22 through a resistance, such as the dynamic braking grid 36, or retarding grid, as shown.

As further illustrated in FIG. 1, the drive system 10 also includes an engine radiator fan 38 driven by the engine 12 to provide cooling for the engine 12. The system 10 may also include one or more control and motor cooling fans 40 mechanically coupled to the alternator 14. The cooling fan(s) 40 is configured to provide cooling for all components of the traction drive system, such as the inverters 20, 22, traction motors 24, 26 and the like. The traction alternator 14 may also be coupled to a hydraulic pump 42 which provides hydraulic pressure for use by accessories or other components of the vehicle. That is, in addition to providing electrical power to the traction bus 16 to enable operation of the traction motors 24, 26 to propel the vehicle, the alternator 14, via power from the engine 12, provides electrical power to other components such as hydraulic pumps and cooling fans. As will be readily appreciated, therefore, these components require power from the engine 12, even in a dynamic braking mode of operation, which increases fuel consumption and decreases efficiency of the vehicle, as a whole. At peak retard/dynamic braking effort, on hot days, upwards of 200 horsepower may be needed just to power the auxiliary loads for cooling and hydraulics.

In embodiments, the system 10 is configured to reclaim dynamic braking energy when in the dynamic braking mode of operation, and to use this reclaimed energy to cancel engine loads (e.g., from the hydraulic pump 42, control and motor cooling fan(s) 40, etc.) in order to decrease fuel consumption as compared to existing systems. In particular, as illustrated in FIG. 1, the drive system 10 includes a DC electric motor 44 electrically coupled to the dynamic braking grid 36 and mechanically coupled to the engine 12. In an embodiment, the motor 44 is mechanically coupled to the engine through a variable torque type coupling, although a direct mechanical coupling may alternatively be employed. In an embodiment, the coupling may include at least one of a belt, chain, gear, or hydraulic coupling.

The DC motor 44 is therefore configured to receive DC electrical power from the dynamic braking grid 36 during a dynamic braking mode of operation of the vehicle. In particular, the motor 44 utilizes the DC electrical power from dynamic braking to generate a mechanical output which is used to help drive and accelerate the engine 12. In this manner, the motor 44 can be utilized to 'cancel' auxiliary engine loads during a dynamic braking mode of operation, such as cooling fan loads and hydraulic pump loads, thereby decreasing fuel consumption as compared to existing systems which rely solely on the engine to provide auxiliary power.

Figure 2:
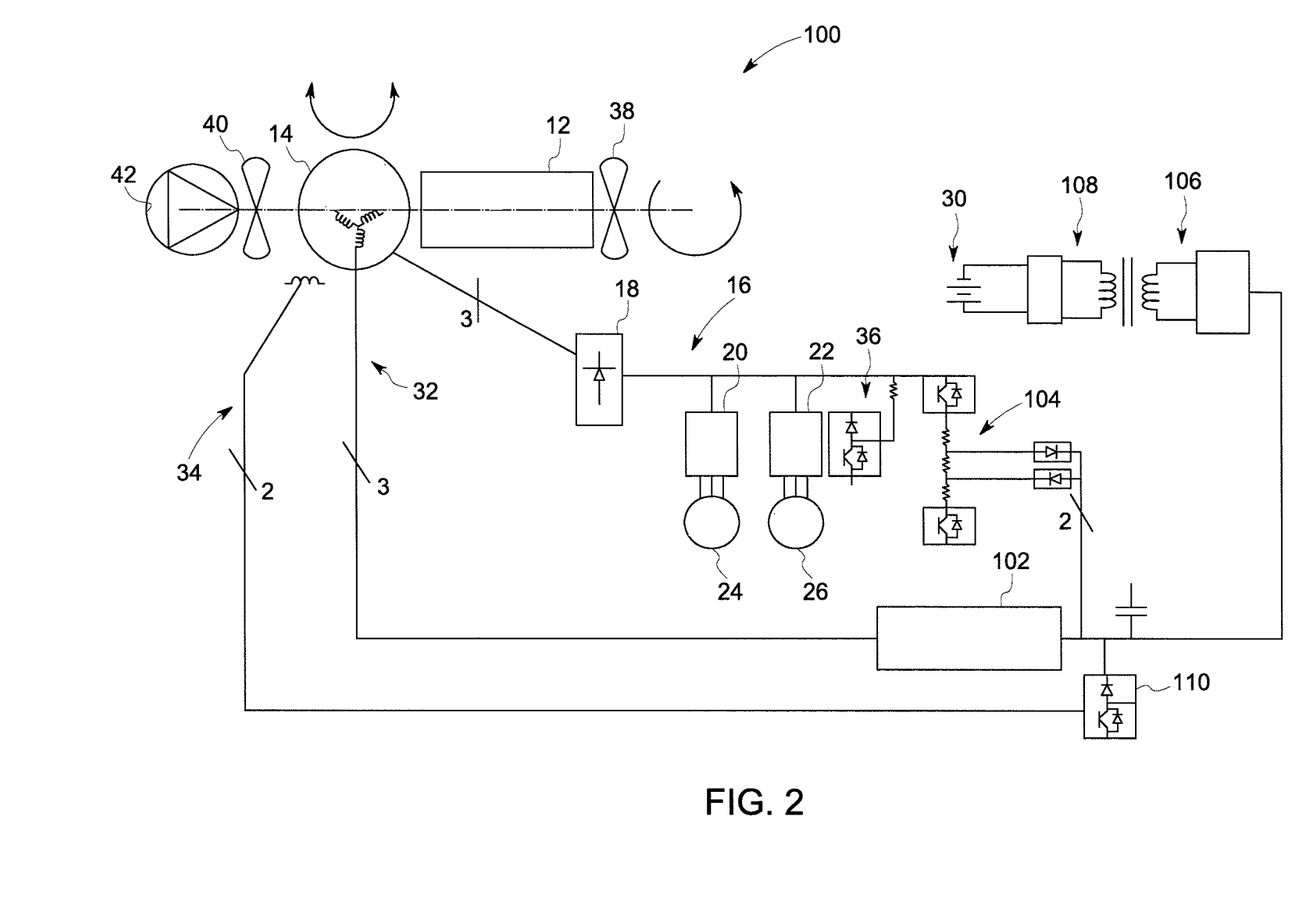
FIG. 2 is a simplified schematic diagram of a system for reducing fuel consumption in a vehicle, according to another embodiment of the invention.

Referring now to FIG. 2, a drive system 100 for a vehicle according to another embodiment of the present invention is illustrated. The drive system 100 is generally similar in configuration and manner of operation to the drive system 10 described above in connection with FIG. 1 (i.e., it is operable in both a propel mode and a dynamic braking mode of operation), where like reference numerals designate like parts. Rather than providing the DC electrical power from the dynamic braking grid to a DC motor connected to the engine 12 to help accelerate the engine 12 to assist with auxiliary engine loads, however, the system 100 is configured to transfer power generated during dynamic braking from the traction link/bus 16 directly to the alternator 14 to essentially negate auxiliary loads on the engine 12.

As shown in FIG. 2, the drive system 100 includes a three-phase inverter/rectifier 102 electrically coupled to the dynamic braking grid 36 of the traction link/bus 16 through a power back-feed, double isolated leg 104. The three-phase inverter/rectifier 102 is, in turn, electrically coupled to the traction alternator 14. The three-phase inverter/rectifier 102 therefore allows power recovered from dynamic braking to be fed back through the alternator 14 as torque to reduce engine load. In particular, the use of the three-phase inverter/rectifier 102 essentially turns the tertiary winding 32 into a full three-phase machine.

As also illustrated in FIG. 2, the system 100 further includes a primary H-bridge 106 and a secondary, battery side H-bridge 108 that serves to connect a battery 30 to both the dynamic braking grid 36 and the inverter/rectifier 102. As illustrated, the battery 30 is electrically coupled to the dynamic braking grid 36 of the traction bus 16 through the power back-feed, double isolated leg 104. This configuration facilitates the charging the battery 30 utilizing dynamic braking energy when the vehicle is operating in a dynamic braking mode (i.e., energy flow from the dynamic braking grid 36 to the battery 30). It also allows power to be transferred from the battery 30 to the alternator 14 (through the inverter/rectifier 102) in order to ensure sufficient voltage for cranking the engine 12 during starting. In particular, the charge of the battery 30 can be utilized as a step-up converter for taking the low voltage DC battery up to the voltage required for engine cranking through the alternator low voltage winding. In connection with this, the system 100 also includes a chopper 110 intermediate the inverter/rectifier 102 and the primary H-bridge 108. The chopper 110 is utilized for field excitation of the alternator 14 during engine cranking. This configuration therefore obviates the need to utilize a separate starter motor to start the engine 12.

In an embodiment, each dynamic braking grid may be capable of 1 MW of power, so that an evenly split leg would allow for approximately 300 KW to feed back through the alternator 14 as torque to reduce engine load in retard/dynamic braking mode. The drive system 100 therefore is capable of providing a number of advantages. First, by applying torque into the alternator 14, loads on the engine (such as the cooling fan 40 and hydraulic pump 42) can essentially be negated. In particular, rather than the engine 12 having to supply the full amount of power to meet auxiliary load demands, torque derived from dynamic braking is utilized to help to drive the alternator 14 in order to help meet such demands. Accordingly, because the engine 12 is not solely responsible for driving the alternator 14, at least during dynamic braking, fuel consumption by the engine may be decreased. In addition to utilizing power generated during dynamic braking to provide a torque into the alternator, power from dynamic braking may be utilized to charge the truck battery 30, which can then be utilized, in conjunction with the chopper 110, to crank and start the engine. As discussed above, this obviates the need to employ a separate starter motor to start the engine 12.

Figure 3:
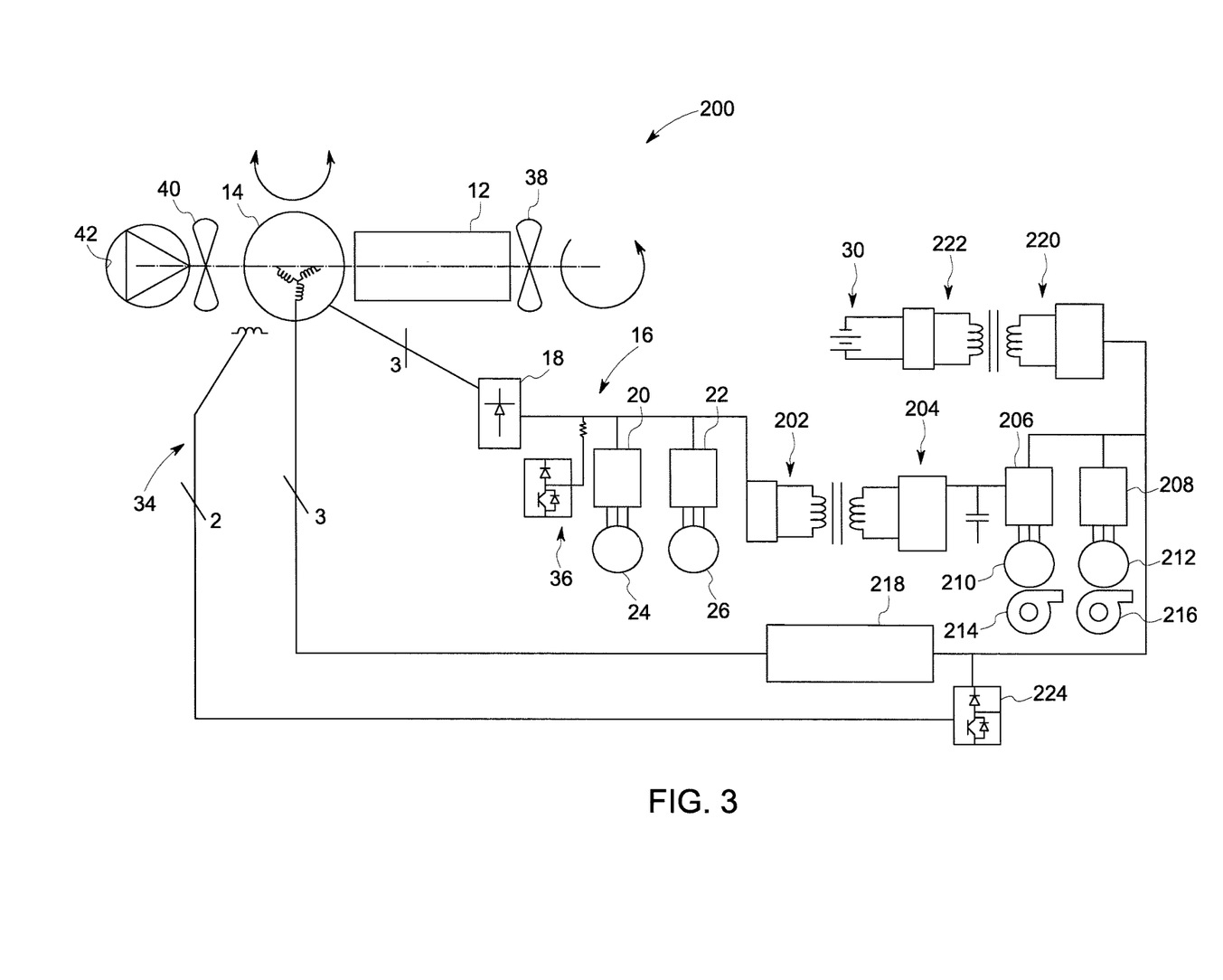
FIG. 3 is a simplified schematic diagram of a system for reducing fuel consumption in a vehicle, according to another embodiment of the invention.

Turning now to FIG. 3, a drive system 200 for a vehicle according to another embodiment of the present invention is illustrated. The drive system 200 is generally similar in configuration and manner of operation to the drive system 10 and drive system 100 described above in connection with FIGS. 1 and 2 (i.e., it is operable in both a propel mode and a dynamic braking mode of operation), where like reference numerals designate like parts.

As shown therein, the drive system 200 includes a primary H-bridge 202 and a secondary H-bridge 204 electrically coupled to the traction bus 16. The secondary H-bridge 204 is electrically coupled to a pair of inverters, such as a third inverter 206 and a fourth inverter 208. These inverters 206, 208 are electrically coupled to third and fourth AC motors 210, 212, respectively, associated with and configured to drive first and second blowers 214, 216. In an embodiment, the first blower 214 is configured to provide cooling for at least one of the inverters 20, 22, 206, 208 and/or the rectifier 18, and the second blower 216 is configured to provide cooling for at least one of the motors 24, 26, 210, 212. This configuration allows energy reclaimed during dynamic braking to pass from the dynamic braking grid 36, over the H-bridge, to the inverters, where it can be utilized to drive the blowers 214, 216 to provide cooling. Accordingly, rather than the engine 12 having to supply the power to drive the fans/blowers (typically driven through the alternator) for cooling the traction drive system, energy recovered during dynamic braking can be harnessed to drive separate blowers to meet the cooling requirements of the traction drive system. Because the engine is therefore not responsible for providing the energy for powering such cooling system components, a decrease in fuel consumption may be realized (i.e., cooling load cancellation).

The use of inverters and motors to drive separate blowers 214, 216 also provides additional advantages from a control perspective. In particular, the use of separate blowers driven by motors allows for more precise control of the speed blowers themselves, and thus more precise control of the level of cooling provided. This can lead to increased efficiency when in propel mode. This is in contrast to systems which utilize a mechanical coupling between the fan/blower and the engine/alternator, which directly ties the speed of the fan/blower to the speed of the engine.

With further reference to FIG. 3, the system 200 also includes a three-phase inverter/rectifier 218 electrically coupled to the traction bus 16 (and thus dynamic braking grid 36) through the H-bridge. The three-phase inverter/rectifier 218 is, in turn, electrically coupled to the traction alternator 14. As discussed above in connection with the system 100 of FIG. 2, the inverter/rectifier 218 allows power recovered from dynamic braking to be fed back through the alternator 14 as torque to reduce engine load. Pushing power back into the alternator 14 in this manner achieves a sort of engine load cancellation, as this recovered power can be utilized to drive the alternator 14 (rather than, or in addition to, the engine 12) in order to drive cooling fan 40 (where utilized), the hydraulic pump 42 or other auxiliary loads. In this manner, fuel consumption by the engine during dynamic braking may be reduced.

As further illustrated in FIG. 3, the system 200 (like system 100) also includes a primary side battery H-bridge 220 and a secondary, battery side H-bridge 222 that serves to connect a battery 30 to both the traction bus 16 and the inverter/rectifier 218. This configuration facilitates the charging the battery 30 utilizing dynamic braking energy when the vehicle is operating in a dynamic braking mode (i.e., energy flow from the dynamic braking grid 36 to the battery 30). It also allows power to be transferred from the battery 30 to the alternator 14 (through the inverter/rectifier 218) in order to ensure sufficient voltage for cranking the engine 12 during starting. In particular, the battery charge can be utilized as a step-up converter for taking the low voltage DC battery up to the voltage required for engine cranking through the alternator low voltage winding. In connection with this, the system 200 also includes a chopper 224 configured for field excitation of the alternator 14 during engine cranking. This configuration therefore obviates the need to utilize a separate starter motor to start the engine 12.

The drive system 200 therefore is capable of providing a number of advantages. First, by applying torque into the alternator 14, loads on the engine (such as the hydraulic pump 42) can essentially be negated. In particular, rather than the engine 12 having to supply the full amount of power to meet auxiliary load demands, torque derived from dynamic braking is utilized to help to drive the alternator 14 in order to help meet such demands. The use of stand-alone blowers 214, 216 powered by dynamic braking energy also takes cooling loads off of the engine. As a result of the above, fuel consumption by the engine may be decreased. In addition to utilizing power generated during dynamic braking to provide a torque into the alternator and for powering stand-alone blowers, power from dynamic braking may be utilized to charge the truck battery 30, which can then be utilized, in conjunction with the chopper 224, to crank and start the engine. As discussed above, this obviates the need to employ a separate starter motor to start the engine 12, resulting in greater efficiency and reduced system cost and complexity, as a whole.

Figure 4:
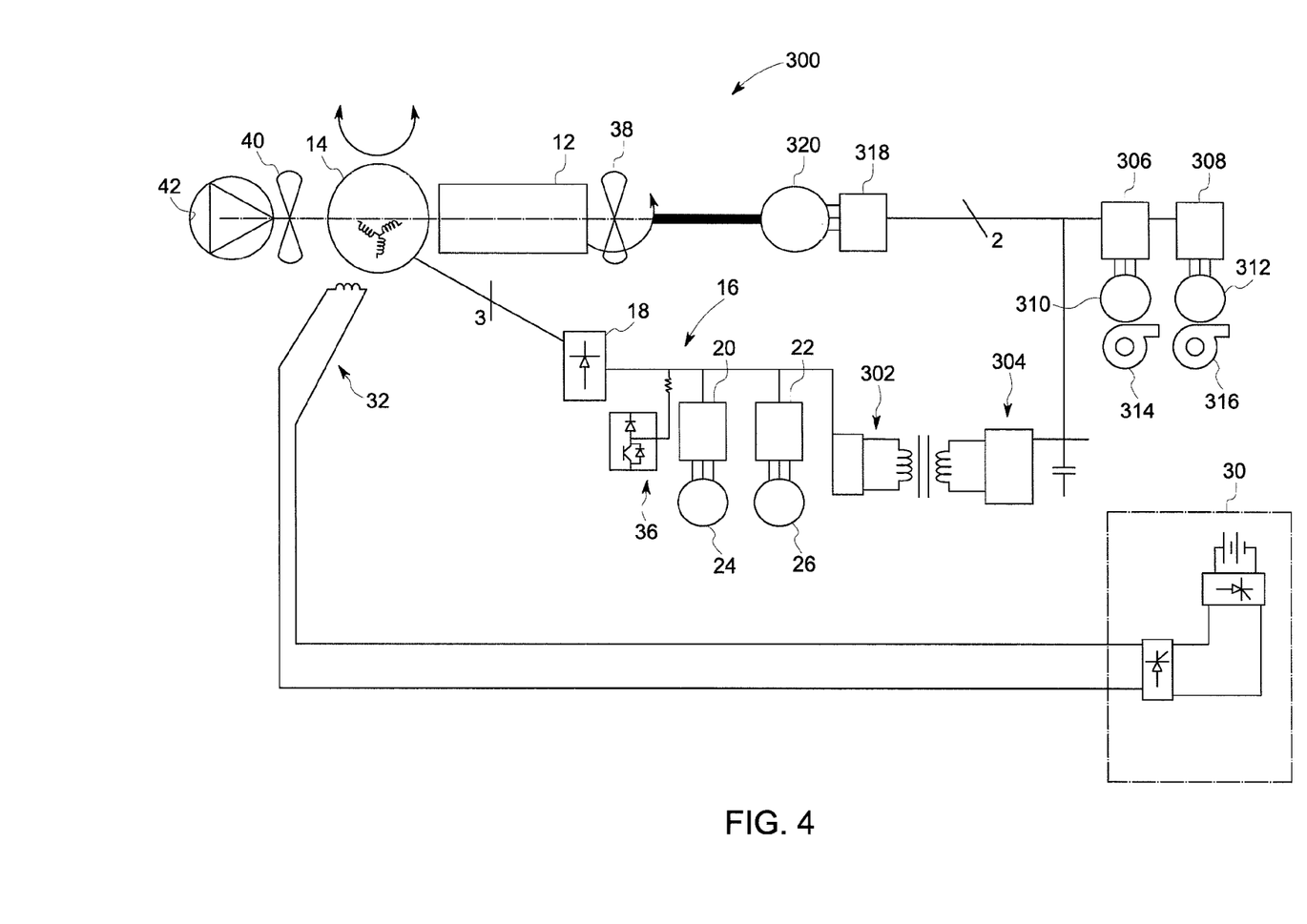
FIG. 4 is a simplified schematic diagram of a system for reducing fuel consumption in a vehicle, according to another embodiment of the invention.

FIG. 4 illustrates a drive system 300 for a vehicle according to yet another embodiment of the present invention. Like the drive system 200 of FIG. 3, drive system 300 includes a primary H-bridge 302 and a secondary H-bridge 304 electrically coupled to the traction bus 16. The secondary H-bridge 304 is electrically coupled to a pair of inverters, such as a third inverter 306 and a fourth inverter 308. These inverters 306, 308 are electrically coupled to third and fourth AC motors 310, 312, respectively, associated with and configured to drive first and second blowers 314, 316. In an embodiment, the first blower 314 is configured to provide cooling for at least one of the inverters 20, 22, 306, 308 and/or the rectifier 18, and the second blower 316 is configured to provide cooling for at least one of the motors 24, 26, 310, 312, as discussed above. As also discussed above, this configuration allows energy reclaimed during dynamic braking to pass from the dynamic braking grid 36, over the H-bridge, to the inverters, where it can be utilized to drive the blowers 314, 316 to provide cooling. Accordingly, rather than the engine 12 having to supply the power to drive the fans/blowers (typically driven through the alternator) for cooling the traction drive system, energy recovered during dynamic braking can be harnessed to drive separate blowers to meet the cooling requirements of the traction drive system. Because the engine is therefore not responsible for providing the energy for powering such cooling system components, a decrease in fuel consumption may be realized.

As discussed previously, the use of inverters and motors to drive separate blowers 314, 316 also provides additional advantages from a control perspective. In particular, the use of separate blowers driven by AC motors allows for more precise control of the speed blowers themselves, and thus more precise control of the level of cooling provided. This can lead to increased efficiency when in propel mode. This is in contrast to systems which utilize a mechanical coupling between the fan/blower and the engine/alternator, which directly ties the speed of the fan/blower to the speed of the engine.

With further reference to FIG. 4, the system 300 also includes a fifth inverter 318 electrically coupled to the traction bus 16 (and thus dynamic braking grid 36) through the H-bridge and an AC motor 320 electrically connected to the inverter 318. As illustrated, the AC motor 320 is mechanically coupled to the engine 12. In an embodiment, the coupling may be a direct coupling. In other embodiments, the coupling may be an indirect coupling such as, for example, using a belt drive or the like. In an embodiment, the motor 320 is a 75 horsepower motor capable of producing approximately 128 lb·ft of torque at approximately 3900 rpm. In a dynamic braking mode of operation, DC electrical power from the dynamic braking grid 36 is converted to AC power by the inverter 318, which is then supplied to the AC motor 320. The AC motor produces a mechanical output which is used to help drive and accelerate the engine 12. In this manner, the motor 320 can be utilized to 'cancel' auxiliary engine loads during a dynamic braking mode of operation, such as cooling fan loads and hydraulic pump loads, thereby decreasing fuel consumption as compared to existing systems which rely solely on the engine to provide auxiliary power.

As will be readily appreciated, the system 300 is generally similar to the system 10 discussed above in connection with FIG. 1, however, an inverter 318 and AC motor 320 is utilized in place of the DC motor 44. The use of the AC motor 320 instead of a DC motor allows for speed and torque control. In particular, by using an AC motor, the speed and torque input to the engine can be more precisely controlled, in contrast to the system 10 of FIG. 1, which allows for more precise control over how much engine load cancellation is achieved.

Figure 5:
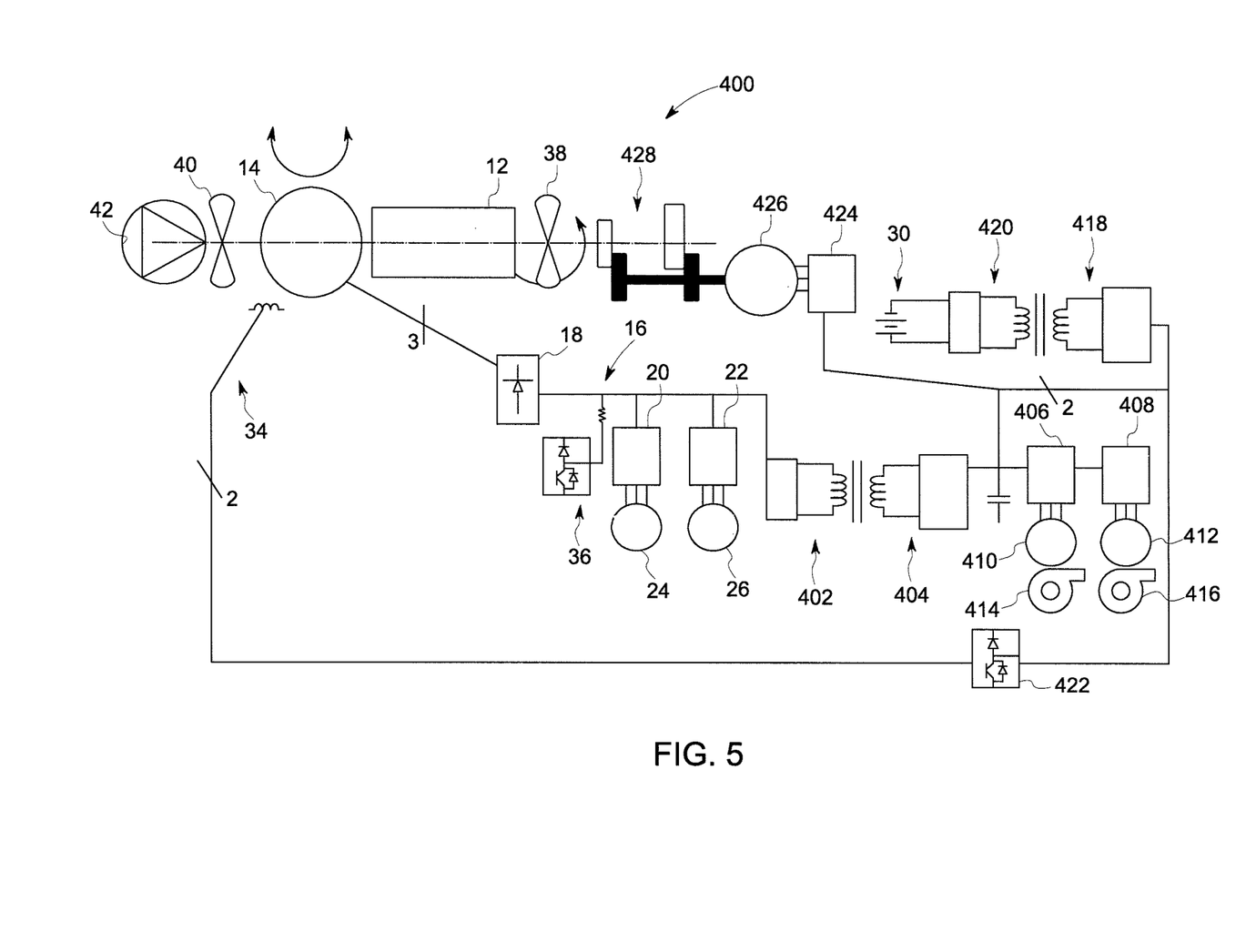
FIG. 5 is a simplified schematic diagram of a system for reducing fuel consumption in a vehicle, according to another embodiment of the invention.

Referring finally to FIG. 5, a drive system 400 for a vehicle according to yet another embodiment of the present invention is illustrated. The drive system 400 includes a primary H-bridge 402 and a secondary H-bridge 404 electrically coupled to the traction bus 16. The secondary H-bridge 404 is electrically coupled to a pair of inverters, such as a third inverter 406 and a fourth inverter 408. These inverters 406, 408 are electrically coupled to third and fourth motors 410, 412, respectively, associated with and configured to drive first and second blowers 414, 416. In an embodiment, the first blower 414 is configured to provide cooling for at least one of the inverters 20, 22, 406, 408 and/or the rectifier 18, and the second blower 416 is configured to provide cooling for at least one of the motors 24, 26, 410, 412. As indicated above in connection with the systems 200 and 300 of FIGS. 3 and 4, this configuration allows energy reclaimed during dynamic braking to pass from the dynamic braking grid 36, over the H-bridge, to the inverters, where it can be utilized to drive the blowers 414, 416 to provide cooling. Accordingly, rather than the engine 12 having to supply the power to drive the fans/blowers (typically driven through the alternator) for cooling the traction drive system, energy recovered during dynamic braking can be harnessed to drive separate blowers to meet the cooling requirements of the traction drive system. Because the engine is therefore not responsible for providing the energy for powering such cooling system components, a decrease in fuel consumption may be realized (i.e., cooling load cancellation).

The use of inverters and AC motors to drive separate blowers 414, 416 also provides additional advantages from a control perspective. In particular, the use of separate blowers driven by AC motors allows for more precise control of the speed blowers themselves, and thus more precise control of the level of cooling provided. This can lead to increased efficiency when in propel mode. This is in contrast to systems which utilize a mechanical coupling between the fan/blower and the engine/alternator, which directly ties the speed of the fan/blower to the speed of the engine.

With further reference to FIG. 5, the system 200 also includes a primary side battery H-bridge 418 and a secondary, battery side H-bridge 420 that serves to connect a battery 30 to the traction bus 16. This configuration facilitates the charging the battery 30 utilizing dynamic braking energy when the vehicle is operating in a dynamic braking mode (i.e., energy flow from the dynamic braking grid 36 to the battery 30). It also allows power to be transferred from the battery 30 to the alternator in order to ensure sufficient voltage for cranking the engine 12 during starting. In particular, the battery charge doubles as a step-up converter for taking the low voltage DC battery up to the voltage required for engine cranking through the alternator low voltage winding. In connection with this, the system 400 also includes a chopper 422 intermediate the battery 30 and alternator 14. The chopper is configured for field excitation of the alternator 14 during engine cranking. This configuration therefore obviates the need to utilize a separate starter motor to start the engine 12, thereby decreasing the complexity and increasing the efficiency of the drive system 400, as a whole. This configuration also obviates the need to employ an alternator field static exciter for field excitation of the alternator 14.

As further illustrated in FIG. 5, the system 500 also employs an inverter (e.g., fifth inverter 424) and an AC motor 426 that is configured to help drive and accelerate the engine 12 in order to decrease engine fuel consumption during dynamic braking. In an embodiment, the motor 426 is a 75 horsepower motor capable of producing approximately 128 lb·ft of torque at approximately 3900 rpm. As illustrated, the AC motor 426 is mechanically coupled to the engine 12 via a clutch 428. In an embodiment, the clutch 428 may include a plurality of gears or belts that allow the motor output to the engine to be precisely controlled. In an embodiment, the clutch 428 is a dual gear/clutch having a first stage having a gear ratio of approximately 15.625:1 and a second stage having a gear ratio of 1:1. The clutch 428 therefore allows for an input to the engine between 128 lb·ft of torque at approximately 3125 rpm, and 2000 lb·ft of torque at approximately 200 rpm.

In operation, dynamic braking energy from the traction bus 16 is fed to the inverter 424, where it is converted to AC power in order to power the motor 426. The motor 426 converts the AC electrical power into a mechanical output, which is provided to the engine 12. As discussed above, the clutch 28 is operable to selectively vary the speed and torque of the mechanical output of the motor 426. The AC motor 426 may therefore be utilize to crank the engine 12 during starting, as well as to provide engine load cancellation (for auxiliary engine loads) during retard. Indeed, this configuration enables reliable starting multiple times per hour, so that the engine can be shut down when idling in order to save fuel.

The embodiments described above therefore provide for various systems and methods for reclaiming dynamic braking energy so that such energy can be pushed back into mechanical engine rotating loads (e.g., mechanical loads and engine spinning losses). Rather than dissipating this energy through resistor grids, the energy can be utilized to charge the truck battery, to drive/accelerate the engine, and/or to provide power for auxiliary engine loads (i.e., engine load cancellation). In addition, the energy may be utilized to power stand-alone blowers for the electric drive system, thereby removing such loads from the engine. The various embodiments described herein may therefore provide for a simplified drive system, such as where the need for separate starter motors can be obviated, as well for a significant reduction in fuel consumption when operating in dynamic braking mode.

Although not illustrated, the drive systems in each of the embodiments described above include a controller configured to control the traction motor system and the various components thereof, and the electricity supplied to and from the traction motor system, as is known in the art.

In an embodiment, a drive system for a vehicle is provided. The drive system includes an engine, an alternator coupled to the engine, the alternator being configured to power at least one auxiliary load, a traction motor system operatively coupled to drive wheels of the vehicle, the traction motor system being configured for receiving primary electrical power from the alternator and for propelling the vehicle in response to the primary electrical power, and a motor electrically connected to the traction motor system and mechanically coupled to the engine. The motor is configured to receive electrical power from the traction motor system in a dynamic braking mode of operation of the traction motor system and to communicate power to the engine during the dynamic braking mode. In an embodiment, the at least one auxiliary load includes at least one of a hydraulic pump and a control and motor cooling fan. In an embodiment, the motor is a DC motor. In an embodiment, the motor is mechanically coupled to the engine through a variable torque coupling. The variable torque coupling may include at least one of a belt, a chain, a gear and a hydraulic coupling. In an embodiment, the motor is mechanically coupled to the engine through a direct mechanical coupling. In another embodiment, the motor is an AC motor. The system may further include an inverter intermediate the traction motor system for converting DC electrical power from the traction motor system into AC electrical power for use by the AC motor. In an embodiment, the system include a clutch assembly connected to the AC motor and the engine, the clutch assembly being configured to selectively alter the magnitude of torque provided to the engine. In an embodiment, the system includes a blower motor electrically coupled to the traction drive system, and a blower mechanically coupled to the blower motor. The blower motor may be configured to receive electrical power from the traction motor system in the dynamic braking mode of operation of the traction motor system and to drive the blower to provide cooling for the traction motor system. In an embodiment, the blower motor is a pair of blower motors and the blower is a pair of blowers. In an embodiment, the blower motor is electrically coupled to the traction motor system over an H-bridge. In an embodiment, the system may include a battery electrically connected to the traction motor system and to the alternator. The battery may be configured to receive electrical power from the traction motor system in the dynamic braking mode of operation of the traction motor system to recharge the battery and to supply stored electrical power to the alternator to crank the engine. In an embodiment, the system includes a chopper intermediate the battery and the alternator, the chopper being configured for field excitation of the alternator during engine cranking. In an embodiment, the vehicle is an off-highway vehicle.

In another embodiment, a drive system for a vehicle is provided. The drive system includes an engine, an alternator coupled to the engine, the alternator being configured to power at least one auxiliary load, a traction motor system operatively coupled to drive wheels of the vehicle, the traction motor system being configured for receiving primary electrical power from the alternator and for propelling the vehicle in response to the primary electrical power, and a three-phase inverter/rectifier electrically connected to the traction motor system and to the alternator. The inverter/rectifier is configured to receive electrical power from the traction motor system in a dynamic braking mode of operation of the traction motor system and to feed the electrical power to the alternator as torque to reduce engine load. In an embodiment, the drive system may also include a battery electrically connected to the traction motor system and to the alternator. The battery is configured to receive electrical power from the traction motor system in the dynamic braking mode of operation of the traction motor system to recharge the battery and to supply stored electrical power to the alternator to crank the engine. In an embodiment, the system also includes a chopper intermediate the battery and the alternator, the chopper being configured for field excitation of the alternator during engine cranking. In an embodiment, the system may include a blower motor electrically coupled to the traction drive system and a blower mechanically coupled to the blower motor. The blower motor is configured to receive electrical power from the traction motor system in the dynamic braking mode of operation of the traction motor system and to drive the blower to provide cooling for the traction motor system. In an embodiment, the blower motor is a pair of blower motors and the blower is a pair of blowers. In an embodiment, the blower motor is electrically coupled to the traction motor system over an H-bridge.

In yet another embodiment, a method is provided. The method includes the steps of providing an engine, generating primary electrical power at an alternator connected to the engine, operating a traction motor coupled in driving relationship to a wheel of a vehicle to propel the vehicle during a propel mode of operation and to generate electricity during a dynamic braking mode of operation, wherein in the propel mode of operation the primary electrical power is transmitted to the traction motor to power the motor, and utilizing the electricity generated during the dynamic braking mode of operation to offset an auxiliary engine load to decrease fuel consumption of the vehicle. In an embodiment, the method may also include the step of utilizing the electricity generated during the dynamic braking mode of operation to power a motor mechanically coupled to the engine, wherein the motor is configured to communicate power to the engine. In an embodiment, the motor is a DC motor, and the motor is mechanically coupled to the engine through a variable torque coupling. In an embodiment, the motor is an AC motor, and the method further includes the step of converting the electricity generated during the dynamic braking mode of operation into AC electrical power for use by the AC motor. In an embodiment, the method also includes the step of operating a clutch assembly connected to the AC motor and the engine to alter the magnitude of torque provided to the engine. In an embodiment, the method also includes utilizing the electricity generated during the dynamic braking mode of operation to power a blower motor connected to a blower, the blower being configured to provide cooling for the traction motor. In an embodiment, the method also includes utilizing the electricity generated during the dynamic braking mode of operation to recharge a battery of the vehicle. In an embodiment, the battery is electrically connected to the alternator, and the method further includes the step of supplying stored electrical power from the battery to the alternator to crank the engine during starting. In an embodiment, the method may also include the step of, at an inverter/rectifier, receiving the electricity generated during the dynamic braking mode of operation, and supplying the electricity to the alternator to produce a torque at the alternator. In an embodiment, the auxiliary engine load includes at least one of a hydraulic pump and a control and motor cooling fan.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A drive system for a vehicle, comprising:
an engine;
an alternator coupled to the engine, the alternator being configured to power at least one auxiliary load;
a traction motor system operatively coupled to drive wheels of the vehicle, the traction motor system being configured for receiving primary electrical power from the alternator and for propelling the vehicle in response to the primary electrical power; and
a motor electrically connected to the traction motor system and mechanically coupled to the engine through a variable torque coupling, the motor being configured to receive electrical power from the traction motor system in a dynamic braking mode of operation of the traction motor system and to communicate power to the engine during the dynamic braking mode.

2. The drive system of claim 1, wherein:
the at least one auxiliary load includes at least one of a hydraulic pump or a control and motor cooling fan.

3. The drive system of claim 1, wherein:
the motor is a DC motor.

4. The drive system of claim 3, wherein:
the motor is mechanically coupled to the engine through a direct mechanical coupling.

5. The drive system of claim 1 wherein:
the variable torque coupling includes at least one of a belt, a chain, a gear, or a hydraulic coupling.

6. The drive system of claim 1, wherein:
the motor is an AC motor; and
wherein the system further includes an inverter intermediate the traction motor system for converting DC electrical power from the traction motor system into AC electrical power for use by the AC motor.

7. The drive system of claim 6, further comprising:
a clutch assembly connected to the AC motor and the engine, the clutch assembly being configured to selectively alter the magnitude of torque provided to the engine.

8. The drive system of claim 6, further comprising:
at least one blower motor electrically coupled to the traction drive system; and
at least one blower mechanically coupled to the blower motor;
wherein the blower motor is configured to receive electrical power from the traction motor system in the dynamic braking mode of operation of the traction motor system and to drive the blower to provide cooling for the traction motor system.

9. The drive system of claim 8, wherein:
the at least one blower motor is a pair of blower motors; and
the at least one blower is a pair of blowers.

10. The drive system of claim 8, wherein:
the blower motor is electrically coupled to the traction motor system over an H-bridge.

11. The drive system of claim 8, further comprising:
a battery electrically connected to the traction motor system and to the alternator;
wherein the battery is configured to receive electrical power from the traction motor system in the dynamic braking mode of operation of the traction motor system to recharge the battery and to supply stored electrical power to the alternator to crank the engine.

12. The drive system of claim 11, further comprising:
a chopper intermediate the battery and the alternator, the chopper being configured for field excitation of the alternator during engine cranking.

13. The drive system of claim 1, wherein:
the vehicle is an off-highway vehicle.

14. A method, comprising the steps of:
generating primary electrical power at an alternator connected to an engine;
operating a traction motor coupled in driving relationship to a wheel of a vehicle to propel the vehicle during a propel mode of operation and to generate electricity during a dynamic braking mode of operation, wherein in the propel mode of operation the primary electrical power is transmitted to the traction motor to power the motor;
utilizing the electricity generated during the dynamic braking mode of operation to power a motor configured to communicate power to the engine to offset an auxiliary engine load to decrease fuel consumption of the vehicle; and
controlling at least one of a speed and a torque of the motor in dependence upon a desired degree of offset for the auxiliary engine load.

15. The method according to claim 14, wherein:
the motor is a DC motor; and
the motor is mechanically coupled to the engine through a variable torque coupling.

16. The method according to claim 14, wherein:
the motor is an AC motor; and
wherein the method further includes the step of converting the electricity generated during the dynamic braking mode of operation into AC electrical power for use by the AC motor.

17. The method according to claim 16, further comprising the step of:
operating a clutch assembly connected to the AC motor and the engine to alter the magnitude of torque provided to the engine.

18. The method of according to claim 17, further comprising the step of:
utilizing the electricity generated during the dynamic braking mode of operation to power a blower motor connected to a blower, the blower being configured to provide cooling for the traction motor.

19. The method according to claim 17, further comprising the step of:
utilizing the electricity generated during the dynamic braking mode of operation to recharge a battery of the vehicle.

20. The method according to claim 19, wherein:
the battery is electrically connected to the alternator; and
the method further includes the step of supplying stored electrical power from the battery to the alternator to crank the engine during starting.

21. The method according to claim 14, further comprising the step of:
at an inverter/rectifier, receiving the electricity generated during the dynamic braking mode of operation, and supplying the electricity to the alternator to produce a torque at the alternator.

22. The method according to claim 4, wherein:
the auxiliary engine load includes at least one of a hydraulic pump or a control and motor cooling fan.

* * * * *